United States Patent [19]

Tanaka et al.

[11] Patent Number: 5,184,109
[45] Date of Patent: Feb. 2, 1993

[54] OVERCHARGE PREVENTIVE DEVICE FOR AUTOMOTIVE BATTERIES

[75] Inventors: Hirokazu Tanaka; Koichi Ito, both of Himeji, Japan

[73] Assignee: Mitsubishi Denki K.K., Tokyo, Japan

[21] Appl. No.: 641,413

[22] Filed: Jan. 15, 1991

[30] Foreign Application Priority Data

Jan. 17, 1990 [JP] Japan ................. 2-3451[U]
Jan. 20, 1990 [JP] Japan ................. 2-3985[U]

[51] Int. Cl.$^5$ .............................. B60Q 1/00
[52] U.S. Cl. ......................... 340/455; 340/632; 340/636; 340/438
[58] Field of Search ............ 340/455, 438, 632, 636, 340/662, 691; 324/426, 427, 433; 320/46; 307/10.7

[56] References Cited

U.S. PATENT DOCUMENTS

| | | |
|---|---|---|
| 3,548,286 | 12/1970 | Giacalone et al. ............... 320/46 |
| 4,565,991 | 1/1986 | Lupoli et al. .................. 340/438 |
| 4,785,280 | 11/1988 | Fubini et al. ................. 340/438 |
| 4,894,553 | 1/1990 | Kaneyuki . | |

Primary Examiner—Jin F. Ng
Assistant Examiner—Dov Popovici
Attorney, Agent, or Firm—Sughrue, Mion, Zinn, Macpeak & Seas

[57] ABSTRACT

An overcharge preventive device for an automotive battery charging circuit comprises an odorant sensor 6 for detecting the amount of gas generated from the battery 1 during charging (FIG. 3). A detector circuit 7 generates an overcharge detection signal when the amount of gas exceeds a predetermined level. In response thereto, the display or monitor lamp 8 displays the overcharged state, and the interruptor circuit 9 separates the alternator 5 from the battery 1. Alternatively, when the automobile has an audio device such as radio, a voltage detector 19 detects the voltage across the load 4 and outputs a signal when the voltage exceeds a predetermined level, an alarm signal generator 20 generating an audio signal in response to the output signal of the voltage detector 19, such that an alarm sound or voice is produced by a loudspeaker 17 via the amplifier 16 (FIG. 4).

7 Claims, 4 Drawing Sheets

OVERCHARGE PREVENTIVE DEVICE FOR AUTOMOTIVE BATTERIES

BACKGROUND OF THE INVENTION

This invention relates to overcharge preventive devices for preventing, or for issuing an alarm for, an occurrence of overcharge of automotive batteries.

FIG. 1 shows a schematic circuit diagram of a typical automotive battery charging device. A battery 1 is coupled, via a main fuse 2 and a key switch 3, across an electric load 4 and the ignition system of an automotive engine. Further, an alternator (AC generator provided with a full-wave rectifier) 5 is coupled across the battery 1 via the fuse 2. When the key switch 3 is made, the voltage of the battery 1 is applied across a starter motor (not shown) such that the engine is started. The alternator 5 is then driven by the started engine, to supply the output voltage to the battery 1 and the load 4.

This charging circuit, however, has the following problem. When the voltage regulator of the alternator 5 malfunctions and the output voltage of the alternator 5 rises above a predetermined level, an abnormally high voltage is applied across the battery 1 and the load 4. The main fuse 2 usually has the rating of 60 to 80 amperes in accordance with the overall load. Thus, in the case where the output voltage of the alternator 5 rises abruptly to a very high level, a large current flows into the battery 1 and melts the fuse 2, thereby preventing the overcharge of the battery 1. When, however, the alternator 5 and the battery 1, etc., are at a high temperature, or when the rpm of the enigne is low, or when a multitude of loads 4 are in use, the level of current that flows into the battery 1 remains relatively low and the fuse 2 remains unmelted, such that the battery 1 is gradually overcharged. This results in an occurrance of leakage of the liquid contained in the battery, the corrosion of the hood of the automobile due to the gas generated from the battery 1, and failures of the electric equipment due to the application of high voltage to the electric load 4.

FIG. 2 shows in detail a charging circuit provided with a conventional overcharge alarm device. A battery 1 is coupled across an alternator (charging AC generator) 2, and, via a switch 3, across a load 4. The outputs of the armature windings 5 of the alternator 2 are coupled to the full-wave rectifier circuit 6, the first output terminal 61 of which is coupled directly to the positive terminal of the battery 1, while the second output terminal 62 of which is coupled to the positive terminal of the battery 1 via a charge indicator lamp 7 and the key switch 8, as well as to a terminal of the field winding 9. A voltage regulator 10 is coupled to the two terminals of the field winding 9 to regulate the field current flowing through the field winding 9. The input of the regulator 10 is coupled to the positive terminal of the battery 1 via the key switch 8. A voltage detector 11 coupled across the load 4 detects the voltage applied thereacross. An alarm sound generator 12 generates an alarm sound when the voltage detected by the voltage detector 11 rises above a predetermined level.

The method of operation of the circuit of FIG. 2 is as follows. When the key switch 8 is turned on, the voltage across the battery 1 is applied across the starter motor (not shown), thereby starting the engine. The charging generator 2 is thus driven to generate an output voltage, and thereby charges the battery 1 and supplies power to the load 4 via the switch 3 which is made together with the key switch 8. The output voltage of the charging generator 2 is controlled within a predetermined range by the operation of the regulator 10. Thus, in the normal operation, the voltage detector 11 does not detect an abnormally high voltage and the alarm generator 12 is not activated. On the other hand, when an abnormally high voltage is generated by the charging generator device 2 due to the failure of the regulator 10, etc., this abnormally high voltage is detected by the voltage detector 11, and an alarm sound is generated in response thereto by the alarm generator 12, thereby notifying the driver of an occurrance of an abnormal state.

By the way, before the engine is started, the current from the battery 1 flows through the charge indicator lamp 7 to turn it on. On the other hand, after the engine is started, the voltage levels at the first and the second regulator outputs 61 and 62 become balanced, and hence the lamp 7 is turned off.

The circuit of FIG. 2 still has this problem: The provision of the alarm sound generator 12 results in an increased production cost and a requirement for a larger installation space.

SUMMARY OF THE INVENTION

It is an object of this invention to provide an overcharge preventive device for an automotive battery which is capable of preventing, and alerting the driver of, occurrances of overcharge of the battery.

It is another object of this invention to provide an inexpensive and small-sized overcharge preventive device which informs the driver of occurances of overcharge by means of an audio signal (an alarm sound or voice).

The first mentioned object is accomplished in accordance with the principle of this invention by an overcharge preventive device for an automotive battery charging circuit, which comprises: an odorant sensor means for detecting an amount of gas developed from the battery when the battery is being charged by the charging generator circuit; an overcharge detector means, disposed near said battery, for detecting an overcharged state of the battery when an amount of gas detected by said odorant sensor means exceeds a predetermined level, the overcharge detector means outputting an output signal when an overcharged stated is detected; and an alerting means (such as a monitor lamp) for alerting a driver of said automobile in response to the output of said overcharge detector means. It is preferred that the device further comprises an interruptor means for electrically separating said charging generator circuit from said battery in response to an output of said overcharge detector means.

The second-mentioned object is accomplished in accordance with the principle of this invention, in the case where the automobile is provided with an audio device (such as a radio receiver) including an amplifier unit and a loudspeaker coupled to the amplifier unit, by an overcharge preventive device which comprises: an overvoltage detector means, coupled across the battery, for detecting a voltage across said battery and outputting an output signal when said voltage across said battery exceeds a predetermined level; and an alarm signal generator means, having an input coupled to said overvoltage detector means, for generating an audio alarm signal in response to the output of said overvoltage detector means, said alarm signal generator means outputting said audio alarm signal to said amplifier unit such that an alarm sound is generated from said loudspeaker in response to said output signal outputted from the overvoltage detector means. Usually, the audio device is supplied with a power from said battery via a switch inserted between a terminal of said battery and said amplifier unit. Thus, preferably, the overcharge preventive device further comprises: a power control means coupled directly to said battery to be supplied with a voltage therefrom and having an input coupled to the output of said overvoltage detector means, wherein outputs of said power control means are coupled to said alarm signal generator means and said amplifier unit to supply electric power thereto, said power control means supplying power to said alarm signal generator means and said amplifier unit in response to said output signal of said overvoltage detector means, such that the alarm sound is produced from said loud speaker in response to an output of said overvoltage detector means irrespective of whether said switch is turned on or not.

BRIEF DESCRIPTION OF THE DRAWINGS

The features which are believed to be characteristic of this invention are set forth with particularity in the appended claims. The organization and method of operation of this invention itself, however, together with further objects and advantages thereof, will best be understood from the detailed description of the preferred embodiments, taken in connection with the accompanying drawings, in which:

DETAILED DESCRIPTION OF THE PREFERRED EMBODIMENTS

Figure 1:
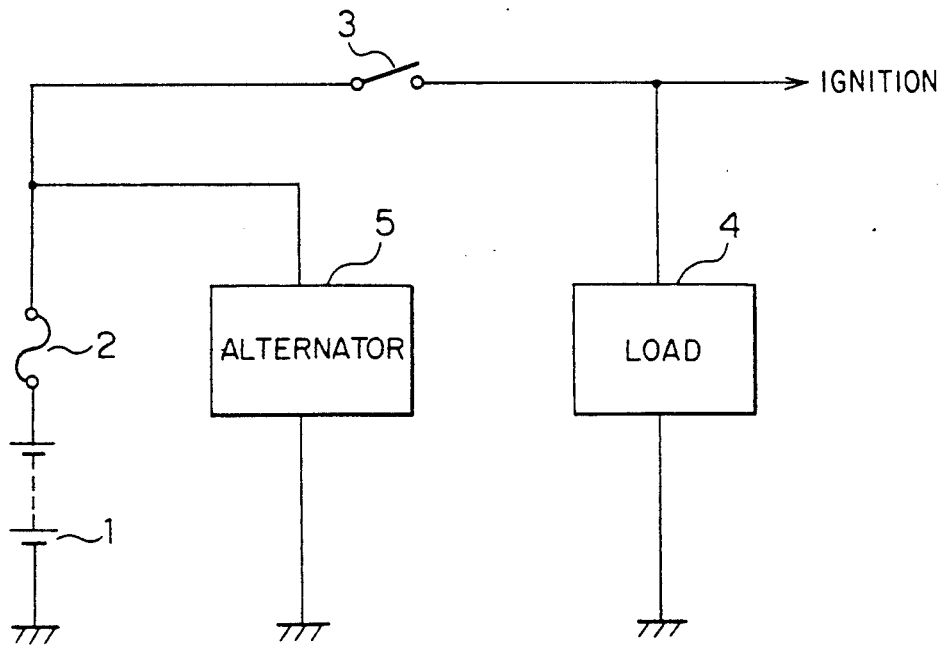
FIG. 1 is a schematic circuit diagram showing a conventional charging circuit for an automotive battery.
Figure 2:
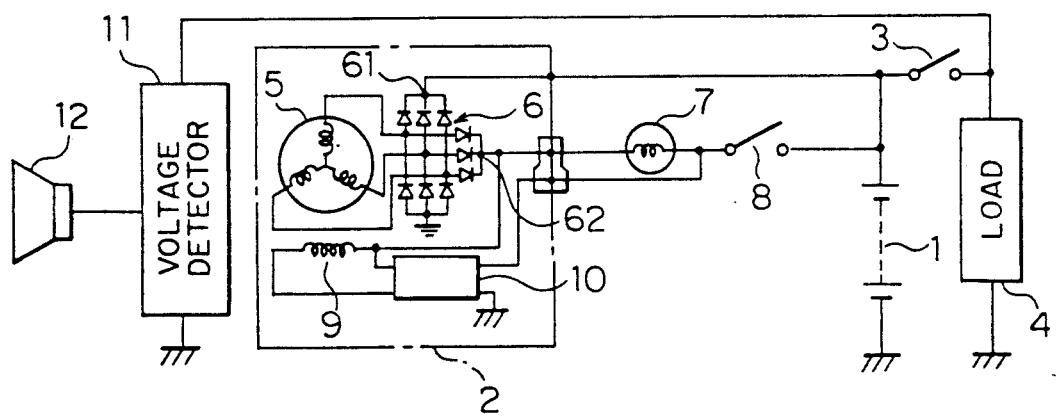
FIG. 2 is a circuit diagram showing a conventional charging circuit provided with an audio overcharge alarm signal generator.
Figure 3:
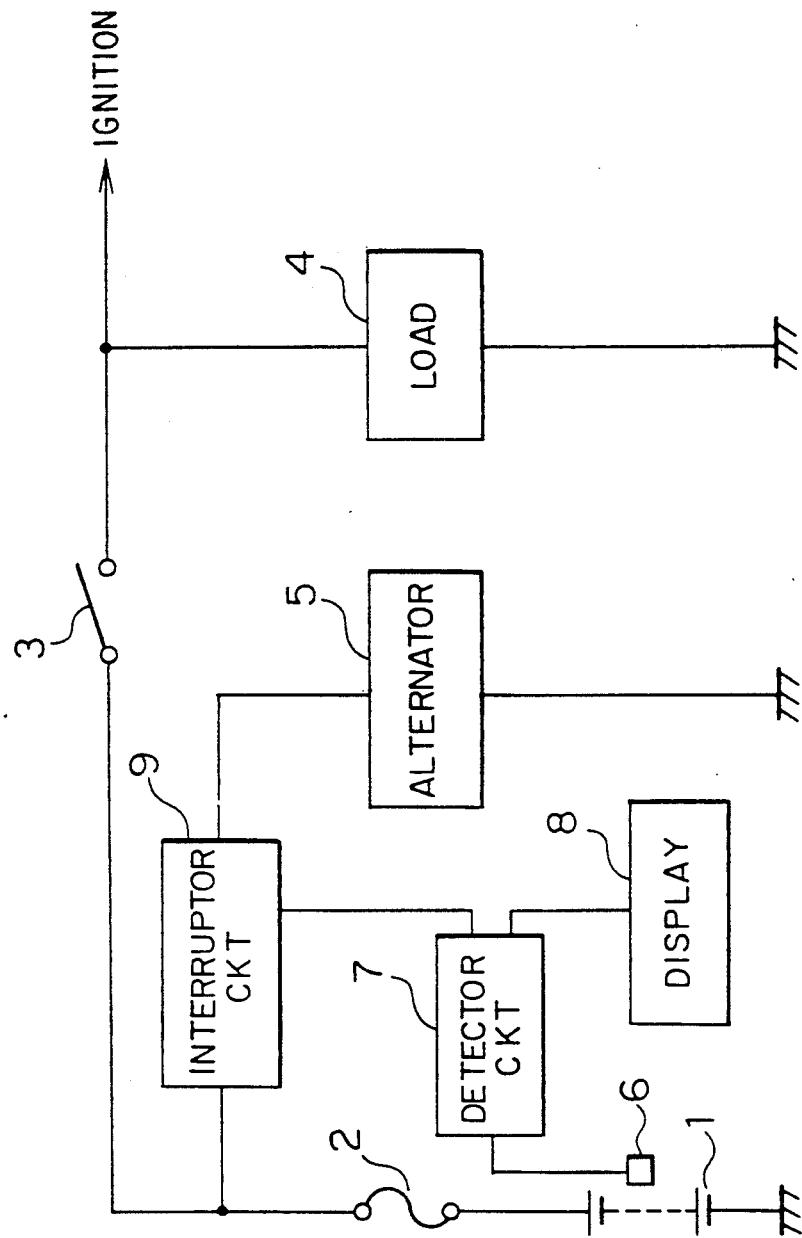
FIG. 3 is a schematic circuit diagram showing an overcharge preventive device for an automotive battery charging circuit according to this invention.

FIG. 3 shows an overcharge preventive device for an automotive battery according to an embodiment of this invention. A battery 1 is coupled, via a main fuse 2 and a key switch 3, across an electric load (electric equipment of the automobile) 4 and the ignition system of the automotive engine. Further, an alternator 5 is couled across the battery 1 via the fuse 2. Due to chemical reactions, a predetermined kind of gas is generated from the battery 1 when it is charged. Thus, an odorant sensor (gas or chemical vapor sensor) 6 disposed near the top of the battery 1 detects the amount of gas generated from the battery. In response to the output of the odorant sensor 6, a detector circuit 7 detects the overcharged state of the battery. The display unit or a monitor lamp (alarm lamp) 8 displays the overcharged state of the battery 1 in response to the output of the detector circuit 7. An interrupter circuit 9, inserted between the battery 1 and the alternator 5, interrupts the charging current flowing from the alternator 5 to the battery 1.

The method of operation of the device, of FIG. 3 is as follows. When the key switch 3 is turned on, the voltage of the battery 1 is applied across a starter motor (not shown) such that the engine is started. The alternator 5 is thus driven by the engine, to supply the output voltage to the battery 1 and the load 4. In the case where an abnormality, such as a malfunctioning of the voltage regulator of the alternator 5, arises in the charging circuit of the battery, and the main fuse 2 remains unmelted, the battery 1 becomes overcharged and thus generates a great amount of gas due to the cheminal reaction taking place therein. The odorant sensor 6 detects the amount of the gas. In response to the output signal of the odorant sensor 6, the detector circuit 7 detects an overcharged state of the battery 1 when the amount of the generated gas rises above a predetermined level. When an overcharged state is detected, the detector circuit 7 turns on the monitor lamp 8 and breaks the interruptor circuit 9 to separate the alternator 5 from the battery 1 and the load 4. The driver of the automobile is thus informed of an occurance of abnormality in the charging circuit, and the failure of the load (electric equipment) 4 is prevented. Further, the shortening of the life of the battery 1 or the corrosion of metallic parts near the battery 1 due to the overcharge of the battery can be effectively prevented.

Figure 4:
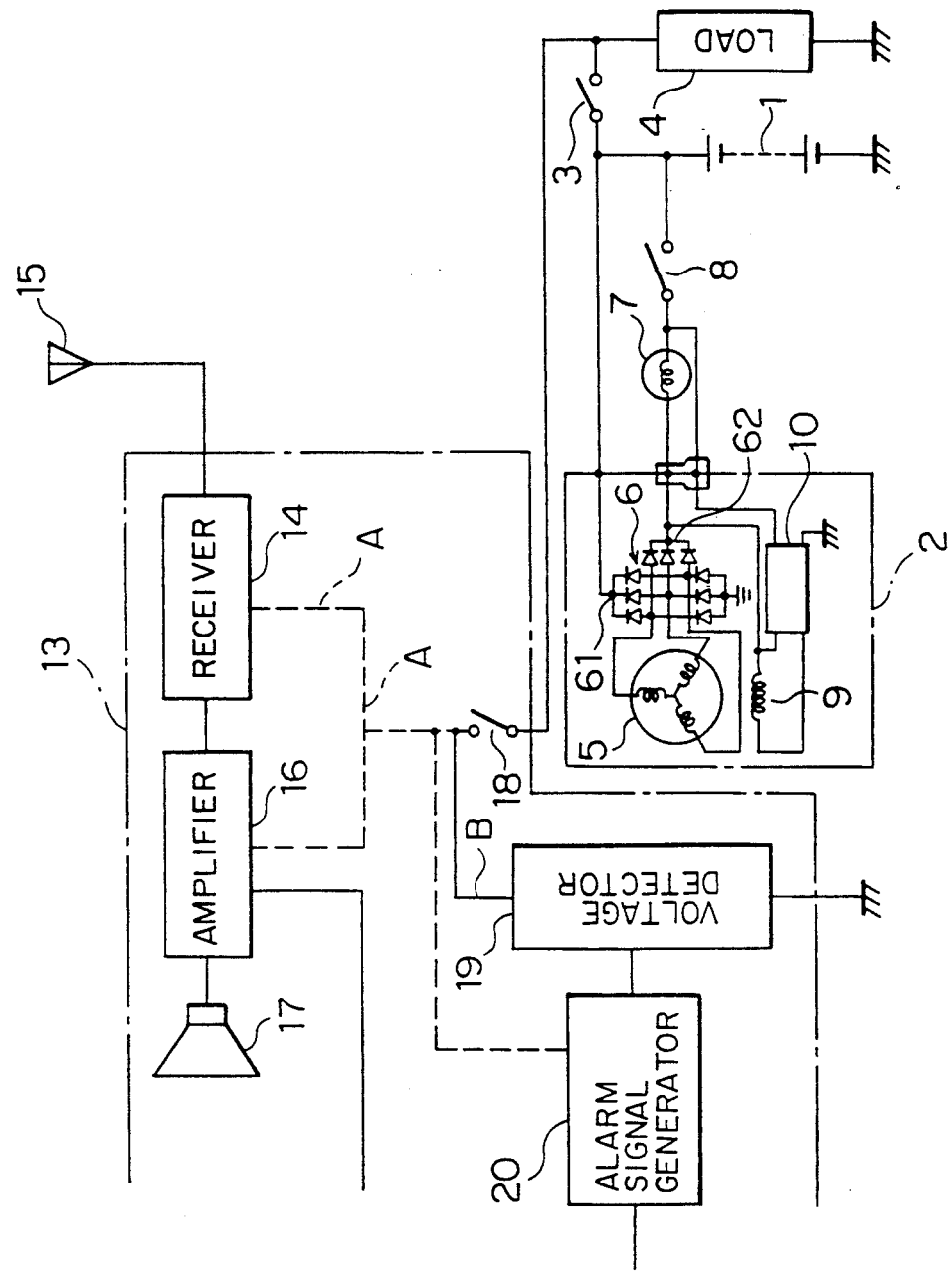
FIG. 4 is a circuit diagram showing another overcharge preventive device according to this invention which is provided with an audio alarm signal generator system.

FIG. 4 shows an overcharge alarm device for an automotive battery charging circuit according to another embodiment of this invention. A battery 1 is coupled across an alternator (charging AC generator]2, and, via a switch 3, across a load 4. The outputs of the armature windings 5 of the alternator 2 are coupled to the full-wave rectifier circuit 6, the first output terminal 61 of which is coupled directly to the positive terminal of the battery 1, while the second output terminal 62 of which is coupled to the positive terminal of the battery 1 via a charge indicator lamp 7 and the key switch 8, as well as to a terminal of the field winding 9. A voltage regulator 10 is coupled to the two terminals of the field winding 9 to regulate the field current flowing through the field winding 9. The inputs of the regulator 10 are coupled across the battery 1 via the key switch 8. Further, a radio receiver set 13 of the automobile, constituting an on-car audio device, comprises a receiver unit 14 having an input coupled to an antenna 15 and an output coupled to a speaker 17 via an amplifier unit 16. The general organization of the radio receiver set 13 is similar to those of conventional car radios. A switch 18 of the radio 13 is coupled, at one side thereof, to the positive terminals of the battery 1 and the charging generator 2 via the switch 3. A voltage detector unit 19, constituting an overcharge voltage detection circuit for detecting the voltage across the terminals of the battery 1, is coupled to the positive terminal of the battery 1 via the radio switch 18 and is built in the car radio 13. An alarm signal generator unit 20 outputs an alarm signal to the amplifier unit 16 in response to the detection by the voltage detector 19 of a voltage above a predetermined level.

The method of operation of the overcharge alarm device of FIG. 4 is as follows. When the key switch 8 is turned on and the engine is started, thereby driving the charging generator 2, an output voltage at a predetermined level is generated by the generator 2. The generated voltage is not only applied across the load 4 via the switch 8, but also is supplied to the receiver unit 14 and the amplifier unit 16 of the radio via the radio switch 18 and the voltage supply lines A represented by dotted lines in FIG. 4. Further, the output voltage of the generator 2 supplied via the radio switch 18 is applied across the voltage detector unit 19 via a line B represented by a solid line in FIG. 4. When this voltage across the voltage detector 19 is under a predetermined voltage level, an alarm signal is not generated and the radio 13 operates in the normal mode to produce a broadcasted program received via the antenna 15. When, on the other hand, an abnormally high voltage is outputted from the charging generator device 2 due to some malfunction thereof, the voltage detector unit 19 detects this abnormal voltage and activates the alarm signal generator 20. In response thereto, the alarm signal generator 20 outputs an alarm signal to the amplifier unit 16. This alarm signal consists of an artificially synthesized voice synthesized by an audio IC (comprised in the alarm signal generator unit 20) for synthesizing a voice, etc. The amplifier unit 16 amplifies this alarm signal and generates an alarm sound or voice via the speaker 17 to alert the driver of the automobile.

Figure 5:
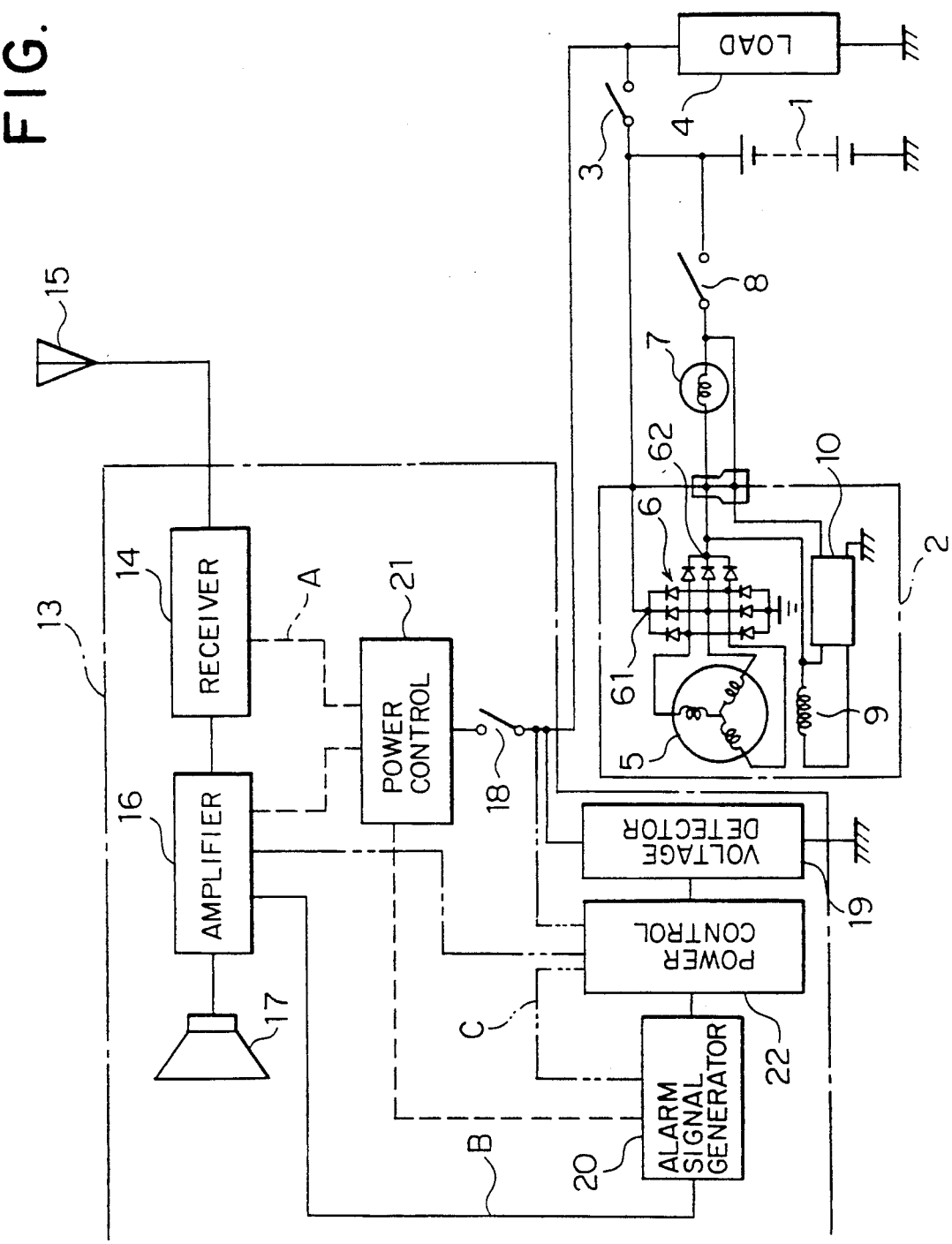
FIG. 5 is a circuit diagram showing still another overcharge preventive device according to this invention provided with an audio alarm signal generator system, which is capable of producing an alarm signal even when the switch of the audio device (radio) is turned off.

FIG. 5 shows another alarming device according to this invention, wherein an alarm sound or voice is generated, whenever an abnormally high voltage detected, irrespective of whether the car radio 13 is turned on or not. Thus, the device of FIG. 5 comprises some additional features: A power control unit 21 for supplyinng a voltage to the receiver unit 14 and the amplifier unit 16 of the radio 13 is coupled to the output of the charging generator 2 via the radio switch 18. Another power control unit 22, supplied directly from the output of the charging generator 2 without an intermediary of the radio switch 18, supplies power to the amplifier unit 16 and the alarm signal generator unit 20, as shown by two-dots-and-dash lines C in FIG. 5. The power cotrol unit 22 is activated in response to the output of the voltage detector 19. The voltage detector 19 is also directly coupled across the outputs of the charging generator 2 without an intermediary of the radio switch 18.

The method of operation of the alarm device of FIG. 5 is similar to that of the device of FIG. 4 when the radio switch is turned on. When an abnormally high voltage is generated during the time the radio (radio switch 18) is turned on, the power is supplied via the power control unit 21 to the receiver unit 14, the amplifier unit 16, and the alarm signal generator unit 20. Otherwise, the operation is similar to that of the device of FIG. 4.

On the other hand, when an abnormallly high voltage is generated during the time the radio switch 18 is turned off, the voltage detector 19 activates, upon detection of an abnormally high voltage, the power control unit 22, which then supplies power to the amplifier 16 and the alarm signal generator unit 20. Further, the alarm signal generator 20 is activated by the voltage detector 19 via the control unit 22, such that an alarm signal is generated from the alarm signal generator 20 and is supplied to the amplifier unit 16 via the line B. Thus an alarm sound or voice is generated by the speaker 17.

It is noted that in the above embodiments of FIGS. 4 and 5, a car radio unit is utilized as an on-car audio device. However, an audio cassette reproducer unit mounted on automobiles may be utilized instead of the car radio.

What is claimed is:

1. An overcharge preventive device for a battery charging circuit of an automobile which includes a battery and a charging generator circuit coupled across the battery, said overcharge preventive device comprising:
    odorant sensor means for detecting an amount of gas developed from said battery when the battery is being charged by said charging generator circuit;
    overcharge detector means, connected to an output of said odorant sensor means and disposed near said battery, for identifying when said generator circuit malfunctions and causes an excessively high charging rate to be supplied to the battery based on a level of said output of said odorant sensor means, said overcharge detector means detecting an overcharged state of the battery when the output of said odorant sensor means indicates that an amount of gas detected by said odorant sensor means has exceeded a predetermined level, the overcharge detector means outputting an output signal only when a generator circuit malfunction is identified;
    interrupter means, connected to the overcharge detector means and connected between the battery and said charging generator circuit, for automatically electrically separating said charging generator circuit from said battery in response to said output of said overcharge detector means which is generated only when said generator circuit malfunction is identified; and
    alerting means, connected to said overcharge detector means, for alerting a driver of said automobile that said generator circuit malfunction has occurred in response to the output of said overcharge detector means.

2. An overcharge preventive device as claimed in claim 1, wherein said alerting means comprises a visual display for displaying an overcharged state.

3. An overcharged preventive device as claimed in claim 3, wherein said display comprises a monitor lamp.

4. An overcharge preventive device for an automotive battery charging circuit which includes a battery and a charging generator circuit coupled across the battery, wherein the automobile is provided with an automotive radio including an amplifier unit and a loudspeaker coupled to the amplifier unit, said overcharge preventive device comprising:
    overvoltage detector means, coupled across said battery, for detecting a voltage across said batter and outputting an output signal when said voltage across said battery exceeds a predetermined level;
    alarm signal generator means, having an input coupled to said overvoltage detector means, for generating an audio alarm signal in response to the output of said overvoltage detector means, said alarm signal generator means outputting said audio alarm signal to said amplifier unit housed within said automotive radio such that an alarm sound is generated from said loudspeaker in response to said output signal outputted from the overvoltage detector means; and
    means for supplying power to said alarm signal generator means and said over voltage detector means to generate an alarm signal from said loud speaker regardless of whether said radio is turned on.

5. An overcharge preventive device as claimed in claim 4, wherein said radio comprises a radio receiver mounted on the automobile.

6. An overcharge preventive device as claimed in claim 4, wherein said radio is supplied with a power from said battery via a switch inserted between a terminal of said battery and said amplifier unit, said overcharge preventive device further comprising:

power control means coupled directly to said battery to be supplied with a voltage therefrom and having an input coupled to the output of said overvoltage detector means, wherein outputs of said power control means are coupled to said alarm signal generator means and said amplifier unit to supply electric power thereto, said power control means being for supplying power to said alarm signal generator means and said amplifier unit in response to said output signal of said overvoltage detector means, such that the alarm sound is produced from said loud speaker in response to an output of said overvoltage detector means irrespective of whether said switch is turned on or not.

7. An overcharge preventive device as claimed in claim 5, wherein said overcharge detection means and said alarm signal generator means are housed within said radio.

* * * * *